United States Patent
Utsumi et al.

(10) Patent No.: US 6,963,969 B2
(45) Date of Patent: Nov. 8, 2005

(54) METHOD AND PROCESSOR FOR INITIALIZING A PLURALITY OF NON-OVERLAPPING AREAS WITH ASSOCIATED FLAGS AND SIGNALS

(75) Inventors: Hiroyuki Utsumi, Kawasaki (JP); Taizoh Satoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 486 days.

(21) Appl. No.: 09/985,766

(22) Filed: Nov. 6, 2001

(65) Prior Publication Data

US 2002/0161992 A1 Oct. 31, 2002

(30) Foreign Application Priority Data

Apr. 26, 2001 (JP) ........................................ 2001-129781

(51) Int. Cl.⁷ .......................................... G06F 15/177
(52) U.S. Cl. ............................ 713/1; 713/2; 713/100
(58) Field of Search ................................ 713/1, 2, 100

(56) References Cited

U.S. PATENT DOCUMENTS

| | | | | |
|---|---|---|---|---|
| 4,688,212 A | * | 8/1987 | MacGinitie et al. | ........ 370/360 |
| 5,155,856 A | * | 10/1992 | Bock et al. | .................... 713/1 |
| 5,315,184 A | * | 5/1994 | Benhamida | .................. 327/19 |
| 5,321,830 A | * | 6/1994 | Nakamura et al. | ............ 714/23 |
| 5,412,794 A | * | 5/1995 | Phoenix et al. | ................ 703/21 |
| 5,860,125 A | | 1/1999 | Reents | |
| 5,928,359 A | * | 7/1999 | Lee | ............................... 713/1 |
| 5,991,207 A | * | 11/1999 | Sedlak et al. | .......... 365/189.01 |
| 6,314,501 B1 | * | 11/2001 | Gulick et al. | ................ 711/153 |
| 6,400,715 B1 | * | 6/2002 | Beaudoin et al. | ........... 370/392 |

FOREIGN PATENT DOCUMENTS

EP          0 356 538 A1     3/1990

OTHER PUBLICATIONS

IBM Technical Disclosure Bulletin, "Selective Reset of Functional Areas", Jan. 1, 1979, TDB-ACC-No. NN79013353, vol. 21, Issue 8, p. 3353.*

* cited by examiner

Primary Examiner—Lynne H. Browne
Assistant Examiner—Tse Chen
(74) Attorney, Agent, or Firm—Staas & Halsey LLP (57) ABSTRACT

The processor includes the first through third areas which can be initialized based on an input of the PRST signal. The second and third areas can be initialized based on an input of the HRST signal. The third area can be initialized based on an input of the SRST signal. The first area is not initialized if the second reset signal is generated. The first and second areas are not initialized if the third reset signal is generated. When initialization is to be performed, the values of the flags corresponding to each area are referred to. Only those areas whose values of the flags have been reset are initialized.

11 Claims, 8 Drawing Sheets

| REGISTER ABBREVIATION | REGISTER NAME (INITIAL VALUE) |
|---|---|
| ARS0 | DRAM ADDRESS AREA SETTING REGISTER 0 |
| ARS1 | DRAM ADDRESS AREA SETTING REGISTER 1 |
| ARS2 | DRAM ADDRESS AREA SETTING REGISTER 2 |
| ARS3 | DRAM ADDRESS AREA SETTING REGISTER 3 |
| AMK0 | DRAM ADDRESS MASK REGISTER 0 |
| AMK1 | DRAM ADDRESS MASK REGISTER 1 |
| AMK2 | DRAM ADDRESS MASK REGISTER 2 |
| AMK3 | DRAM ADDRESS MASK REGISTER 3 |
| DCTL | DRAM CONTROL REGISTER |
| DAMC | DRAM ACCESS MODE CONTROL REGISTER |
| DCFG | DRAM CONFIGURATION CONTROL REGISTER |
| DAN | DRAM ADDRESS NUMBER REGISTER |
| DSTS | DRAM STATUS REGISTER |
| DRCN | DRAM REFRESH CONTROL REGISTER |
| DART | DRAM AUTO REFRESH TIMER REGISTER |
| RSTR | RESET REGISTER |

METHOD AND PROCESSOR FOR INITIALIZING A PLURALITY OF NON-OVERLAPPING AREAS WITH ASSOCIATED FLAGS AND SIGNALS

FIELD OF THE INVENTION

The present invention relates to a processor, and a reset control method for that processor, which can be used in a portable terminal, portable telephone, or digital camera.

BACKGROUND OF THE INVENTION

Generally, many processors are provided with the function of setting appropriate states for processors and for systems formed from those processors by generating reset interruptions using reset signals and executing system initialization programs.

In a processor provided with the above described structure, when a reset signal is input from the outside as a result of the pressing of a reset button or of the input of power, firstly an activation reset operation is executed so as to initialize the storage element inside the processor. Next, reset interruption is generated inside the processor and a program for initialization processing known as a reset vector is read from ROM (Read Only Memory) connected to the exterior of the processor via a bus. By executing this initialization processing program, the registers used for the settings of each device located in the system or in the processor are set. In this way, the environment is organized so that the various application programs are placed in a state of execution readiness.

It should be noted here that, in order to achieve lower power consumption in the processor, if there is no processing deemed to be indispensable being executed in the processor for a set length of time, the processor is provided with a function of stopping the supply of clocks to the processor. In a processor having this type of function, in order to restart the operation of the processor after the clocks have been stopped, it is normal for a reset signal to be input once again.

However, because the ROM is a low speed memory device, the problem exists that when the processor is reactivated after being placed in a stopped state due to the clock being stopped or the like a considerable length of time is needed until the point when all of the initialization setting processing has ended. In particular, in a system in which the reactivation is performed frequently via stop and reset signals of the processor, the problem exists that the activation wait time of the system, which is due to access to the ROM having to be made at each reactivation, increases.

SUMMARY OF THE INVENTION

It is an object of this invention to provide a processor capable of being rapidly reactivated from a stopped state. It is a further object of the present invention to provide a reset control method capable of enabling the rapid reactivation of a processor from a stopped state.

An area in which initial settings are to be made by a reset signal is divided into, for example, a first initial setting area comprising a register group that is essential in order to perform communication between the processor and the outside of the processor; a second initial setting area that comprises the remainder of the area excluding the register group of the first initial setting area and a register group concerned with the execution of instructions within the processor; and a third initial setting area comprising the register group concerned with the execution of instructions within the processor. In the first initial setting area, initial settings are made on the basis of a first reset signal. In the second initial setting area, initial settings are made on the basis of either the first reset signals or second reset signals. In the third initial setting area, initial settings are made on the basis of either the first reset signals, the second reset signals, or third reset signals.

In addition, first, second, and third flags are provided to correspond respectively to the first, second, and third initial setting area. All the flags are cleared by the first reset signal. The remaining flags apart from the first flags are cleared by the second reset signal. The third flags only are cleared by the third reset signal. When the initial setting processing of the first initial setting area is completed, the first flag is set. When the initial setting processing of the second initial setting area and the third initial setting area are completed, the second flag and the third flag are set respectively.

As a result of this invention, initial settings are made for the processor as a whole by the first reset signal. Initial settings are made for the area excluding the register group that is essential for performing communication between the processor and the outside of the processor by the second reset signal. Moreover, initial settings are made only for the register group involved with the execution of instructions within the processor by the third reset signal.

Other objects and features of this invention will become apparent from the following description with reference to the accompanying drawings.

DESCRIPTION OF THE PREFERRED EMBODIMENTS

Figure 1:
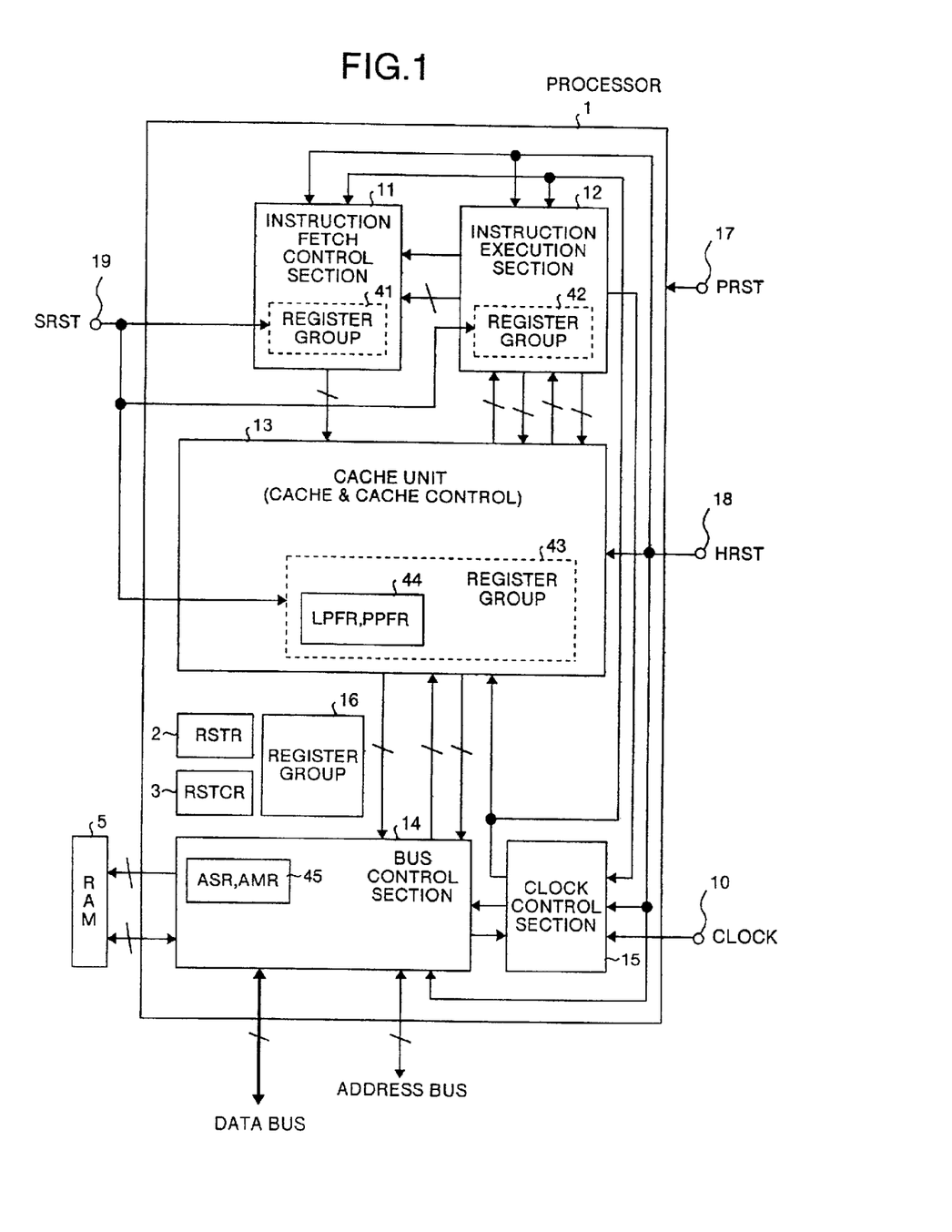
FIG. 1 is a block diagram showing the structure of the main portions of the processor according to the embodiment of the present invention.

The present invention will now be described in detail with reference made to the accompanying drawings. FIG. 1 is a block diagram showing the structure of the main portions of the processor according to the embodiment of the present invention. The processor 1 is provided with the instruction fetching control section 11, instruction control section 12, cache unit 13 comprising cache memory and a cache control section, bus control section 14, clock control section 15, first register group 16, reset register (RSTR) 2, and the setting completion display register (RSTCR) 3.

Second, third, and fourth register groups 41, 42, and 43 each formed form one or two or more registers are provided respectively in the instruction fetching control section 11, the instruction control section 12, and the cache unit 13. The pair of registers (LPSR and PPFR) 44 for converting logical addresses into physical addresses, for example, is provided in the fourth register group 43 in the cache unit 13.

The pair of registers (ASR and AMR) 45 for setting comparative inhibited bits and start addresses of the address range of the RAM 5 forming the local memory for the processor 1 is also provided in the bus control section 14. The processor 1 is connected to unillustrated ROM via an address bus and a data bus controlled by the bus control section 14. Note that, in FIG. 1, those structural portions that are not related to the present invention have not been shown.

In the present embodiment, the first register group 16 and the address setting register 45 for the RAM 5 (local memory) represented by ASR and AMR are the object of the initial setting processing when a PRST signal, which is the first reset signal, is generated. The other registers provided in the bus control section 14 are the objects of the initial setting processing when a PRST signal or an HRST signal, which is the second reset signal, is generated. The second, third, and fourth register groups 41, 42, and 43 are the objects of the initial setting processing when a PRST signal, an HRST signal, or an SRST signal, which is the third reset signal, is generated.

In other words, when a PRST signal is generated, the first register group 16, the address setting register 45 represented by ASR and AMR, registers other than the address setting register 45 represented by ASR and AMR from among the registers provided in the bus control section 14, and the second, third, and fourth register groups 41, 42, and 43 are the objects of the initial setting processing. When an HRST signal is generated, the registers other than the address setting register 45 represented by ASR and AMR from among the registers provided in the bus control section 14, and the second, third, and fourth register groups 41, 42, and 43 are the objects of the initial setting processing.

Moreover, those registers (not illustrated) that have stopped the supply of the clocks to the interior of the processor in the clock control section 15 are also reset as a result of the generation of an HRST signal. As a result, the clock control section 15 restarts the supply to each section of the processor of clocks that are supplied from the outside.

When an SRST signal is generated, the second, third, and fourth register groups 41, 42, and 43 become the objects of the initial setting processing.

Accordingly, in the present embodiment, the first register group 16 and the address setting register 45 represented by ASR and AMR correspond to the first initial setting area. The registers other than the address setting register 45 represented by ASR and AMR from among the registers provided in the bus control section 14 correspond to the second initial setting area.

The second, third, and fourth register groups 41, 42, and 43 correspond to the third initial setting area. In FIG. 1, the symbol 17 indicates the terminal by which the PRST signals are input from the outside (i.e. the PRST terminal); the symbol 18 indicates the terminal by which the HRST signals are input from the outside (i.e. the HRST terminal); and the symbol 19 indicates the terminal by which the SRST signals are input from the outside (i.e. the SRST terminal). The symbol 10 indicates the terminal by which the clocks are input from the outside (i.e. the CLOCK terminal).

Figure 2:
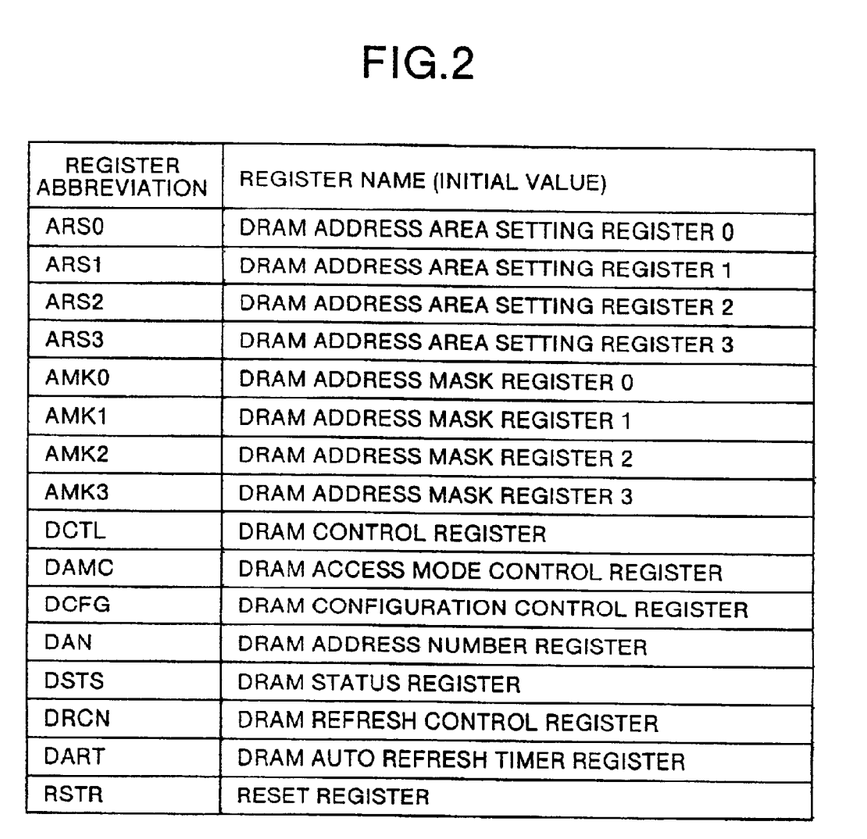
FIG. 2 is a table showing an example of a register that is not initialized by an HRST signal and SRST signal and is initialized by a PRST signal in the processor according to the embodiment of the present invention.

FIG. 2 is a table showing an example of a register contained in the first initial setting area. In this table, ARS0 to ARS3 are DRAM address area setting registers. AMK0 to AMK3 are DRAM address mask registers. DCTL is a DRAM control register for performing the setting of the minimum number of cycles during the DRAM operations that is different for each type of DRAM. DAMC is a DRAM access mode control register for selecting a mode for accessing DRAM.

DCFG is a DRAM configuration register for performing the display and settings of DRAM type, bus width of the DRAM bus, DRAM direct coupling/DIM use, and the like. DAN is a DRAM address number register for setting the RAS address bit number of DRAM connected to four DCS, the CAS address bit number, and the bank address bit number.

DSTS is a DRAM status register showing the state of the SDRAM controller. DRCN is a DRAM refresh control register for supporting auto-refresh and self-refresh as SDRAM refresh. DART is a DRAM auto-refresh time register for stipulating the refresh intervals during auto-refresh. In addition to these, although not shown in the table in FIG. 2, in the first register group 16 there are also a DRAM address area setting register (DARS) for setting the address range of the DRAM memory area and a DRAM address mask register (DAMK) for setting the DRAM address range. Here, the DRAM is the RAM 5 forming the local memory of the processor 1.

Figure 3:
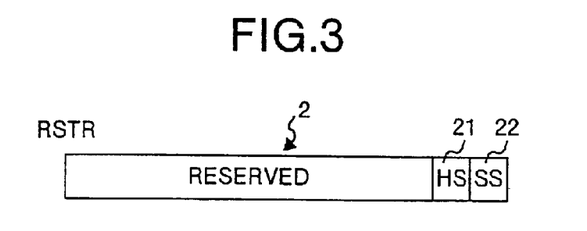
FIG. 3 is a schematic view showing the structure of the reset register of the processor according to the embodiment of the present invention.

FIG. 3 is a schematic view showing the structure of the reset register 2. The reset register 2 is provided with an HS bit 21 and an SS bit 22. Signals that are the equivalent of HRST signals, which are reset signals input from the HRST terminal 18, are asserted inside the processor 1 by writing to the HS bit 21. In addition, signals that are the equivalent of SRST signals, which are reset signals input from the SRST terminal 19, are asserted inside the processor 1 by writing to the SS bit 22.

Figure 4:
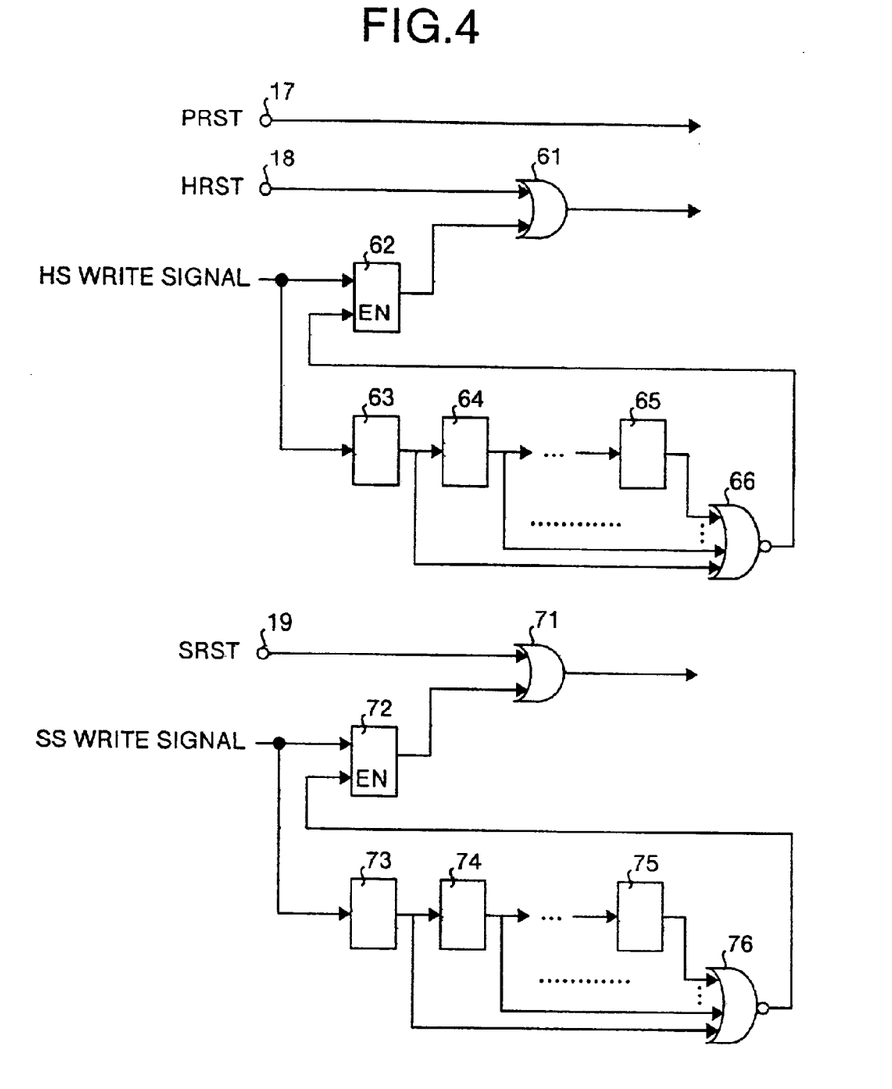
FIG. 4 is a circuit diagram showing the structure of the initialization control section of the processor according to the embodiment of the present invention.

FIG. 4 is a circuit diagram showing the structure of the initialization control section of the processor 1. Note that this initialization control section is omitted in FIG. 1. PRST signals input from the outside via the PRST terminal 17 are supplied as they are to the interior of the processor 1.

HRST signals input from the outside via the HRST terminal 18 (referred to below as external HRST signals) are input to one input terminal of an OR circuit 61. Write signals to the HS bit 21 of the reset register 2 are input into a flip-flop 62 and the output signals from this flip-flop 62 are input into the other input terminal of the OR circuit 61. Namely, HRST signals or signals equivalent to these (referred to below as internal HRST signals) are asserted by the input of external HRST signals or by writing to the HS bit 21. The write signals to the HS bit 21 are supplied to a shift register formed from a plurality of flip-flops 63, 64, 65, etc.

The respective output signals from the plurality of flip-flops 63, 64, 65, etc forming the shift register are input into a NOR circuit 66. The output signals from the NOR circuit 66 are input into the enable terminal (EN) of the flip-flop 62 into which the write signals to the HS bit 21 are input. As a result, during the time the write signals to the HS bit 21 are being shifted in the shift register, internal HRST signals are being continually generated.

The above description also applies for SRST signals input from the outside via the SRST terminal 19 (referred to below as external SRST signals) and the signals that are equivalent to the external SRST signals (referred to below as internal SRST signals) that are generated by writing to the SS bit 22 of the reset register 2. Namely, write signals to the SS bit 22 are supplied to a shift register formed from a plurality of flip-flops 73, 74, 75, etc. The output signals at the various stages of this shift register are supplied via a NOR circuit 76 to the enable terminal (EN) of the flip-flop 72 into which the write signals to the SS bit 22 are input. As a result, internal SRST signals are being continually generated until the shifting of the write signals to the SS bit 22 in the shift register is ended. These internal SRST signals and external SRST signals are input into an OR circuit 71 and are asserted.

Figure 5:
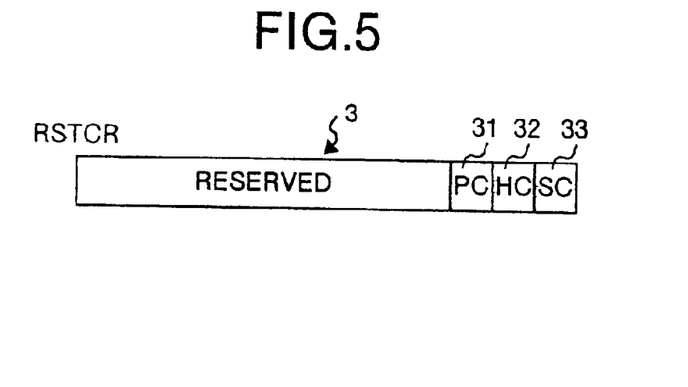
FIG. 5 is a schematic view showing the structure of the setting completion display register of the processor according to the embodiment of the present invention.

FIG. 5 is a schematic view showing the structure of the setting completion display register 3. The setting completion display register 3 is provided with a PC bit 31, an HC bit 32, and an SC bit 33. The PC bit 31 houses a first flag. The first flag indicates whether or not the initial setting processing of the first initial setting area is completed. The HC bit 32 houses a second flag. The second flag indicates whether or not the initial setting processing of the second initial setting area is completed. The SC bit 33 houses a third flag. The third flag indicates whether or not the initial setting processing of the third initial setting area is completed.

Figure 6:
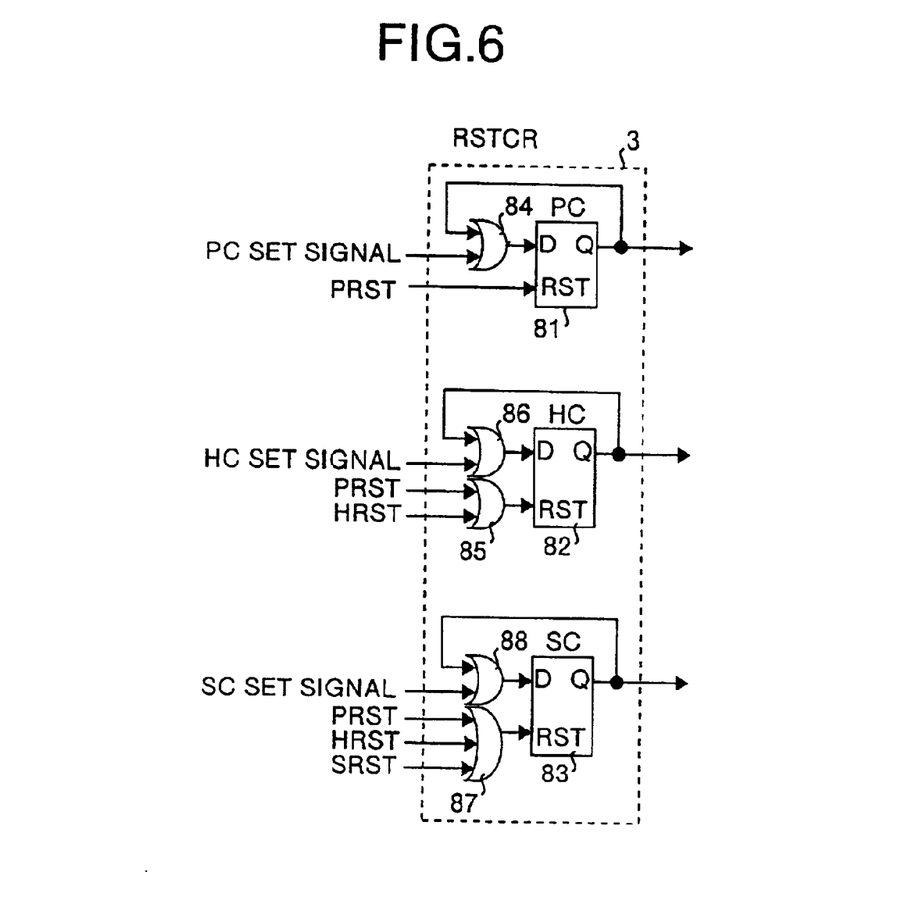
FIG. 6 is a circuit diagram showing the main portions of the setting completion display register of the processor according to the embodiment of the present invention.

FIG. 6 is a circuit diagram showing the structure of the main portions of the setting completion display register 3. The setting completion display register 3 is provided with flip-flops 81, 82, and 83 that correspond respectively to the PC bit 31, the HC bit 32, and the SC bit 33. PRST signals are input into the reset terminal of the flip-flop 81 of the PC bit 31. Signals generated by the completion of the initial setting processing of the first initial setting processing area, namely, signals for setting the first flag of the PC bit 31 (referred to below as PC set signals) are input via an OR circuit 84 to the input terminal of the flip-flop 81. Output signals from the flip-flop 81 are also input into the OR circuit 84. In other words, the PC bit 31 is reset when a PRST signal is asserted. When a PC set signal is input, a state in which the flag is set is maintained until the next PRST signal is asserted.

PRST signals and also output signals from an OR circuit 85 that inputs either an internal or an external HRST signal are input into the reset terminal of the flip-flop 82 of the HC bit 32. Signals generated by the completion of the initial setting processing of the second initial setting processing area, namely, signals for setting the second flag of the HC bit 32 (referred to below as HC set signals) are input via an OR circuit 86 to the input terminal of the flip-flop 82. Output signals from the flip-flop 82 are also input into the OR circuit 86. Accordingly, the HC bit 32 is reset when a PRST signal or an external or internal HRST signal is asserted. When an HC set signal is input, a state in which the flag is set is maintained until the next PRST signal or external or internal HRST signal is asserted.

PRST signals, internal or external HRST signals, and also output signals from an OR circuit 87 that inputs either an internal or an external SRST signal are input into the reset terminal of the flip-flop 83 of the SC bit 33. Signals generated by the completion of the initial setting processing of the third initial setting processing area, namely, signals for setting the third flag of the SC bit 33 (referred to below as SC set signals) are input via an OR circuit 88 to the input terminal of the flip-flop 83. Output signals from the flip-flop 83 are also input into the OR circuit 88. Accordingly, the SC bit 33 is reset when a PRST signal, an internal or external HRST signal, or an internal or external SRST signal is asserted.

When an SC set signal is input, the SC bit 33 maintains a state in which the flag is set until the next PRST signal, internal or external HRST signal, or internal or external SRST signal is asserted. Note that, if the hardware of the processor 1 has a function for automatically generating an initialization sequence, the PC bit 31, the HC bit 32, and the SC bit 33 are automatically set at the completion of this setting sequence. The PC bit 31, the HC bit 32, and the SC bit 33 are set by reset signals that perform the initialization of the corresponding sequencer portions.

Figure 7:
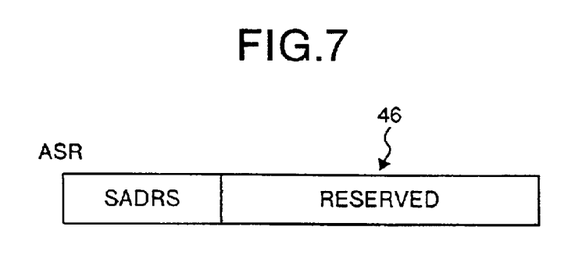
FIG. 7 is a schematic view showing the structure of a register for setting local memory start addresses for the processor according to the embodiment of the present invention.
Figure 8:
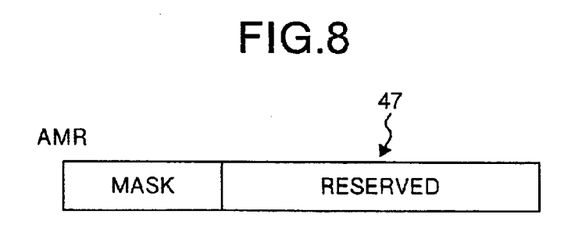
FIG. 8 is a schematic view showing the structure of a register for setting local memory comparative inhibited bits for the processor according to the embodiment of the present invention.
Figure 9:
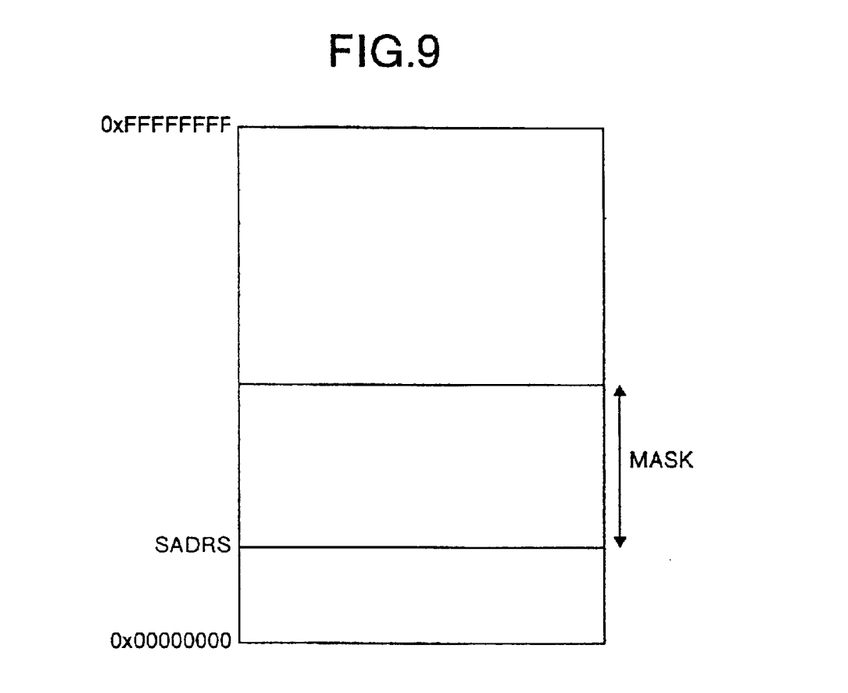
FIG. 9 is a view of a memory map for describing an address assigned to local memory for the processor according the embodiment of the present invention.

FIG. 7 and FIG. 8 are schematic views respectively showing the structures of a register (ASR) 46 for setting a start address and a register (AMR) 47 for setting a comparative inhibited bit of a pair of registers (ASR and AMR) 45 for setting a comparative inhibited bit and start address of an address range of the RAM 5, which is the local memory for the processor 1. FIG. 9 is a view of a memory map schematically showing the addresses assigned to the RAM 5 based on the register (AMR) 47 for setting the comparative inhibited bits and the register (ASR) 46 for setting the start address. Out of those addresses set by the register (ASR) 46 for setting the start address, an address represented by upper order bits that are not masked by the register (AMR) 47 for setting the comparative inhibited bits becomes the address for the area of the RAM 5.

Next, an example of the start sequence of the processor 1 will be explained. To begin with, an explanation will be given about the initialization sequence when PRST signals are asserted when power is supplied while referring to the flow chart shown in FIG. 10. In the flow chart in FIG. 10, firstly, when a PRST signal is asserted (step S1001), the PC bit 31, the HC bit 32, and the SC bit 33 of the setting completion display register (RSTCR) 3 are reset to "0", for example (step S1002). Thereafter, when the PRST signal is negated (step S1003), a request to fetch an instruction is issued from the initial address, for example, "0×FF00_0000". Because effective data is not held in the RAM 5 immediately after the power has been supplied, the processor 1 accesses ROM on an external bus.

Figure 10:
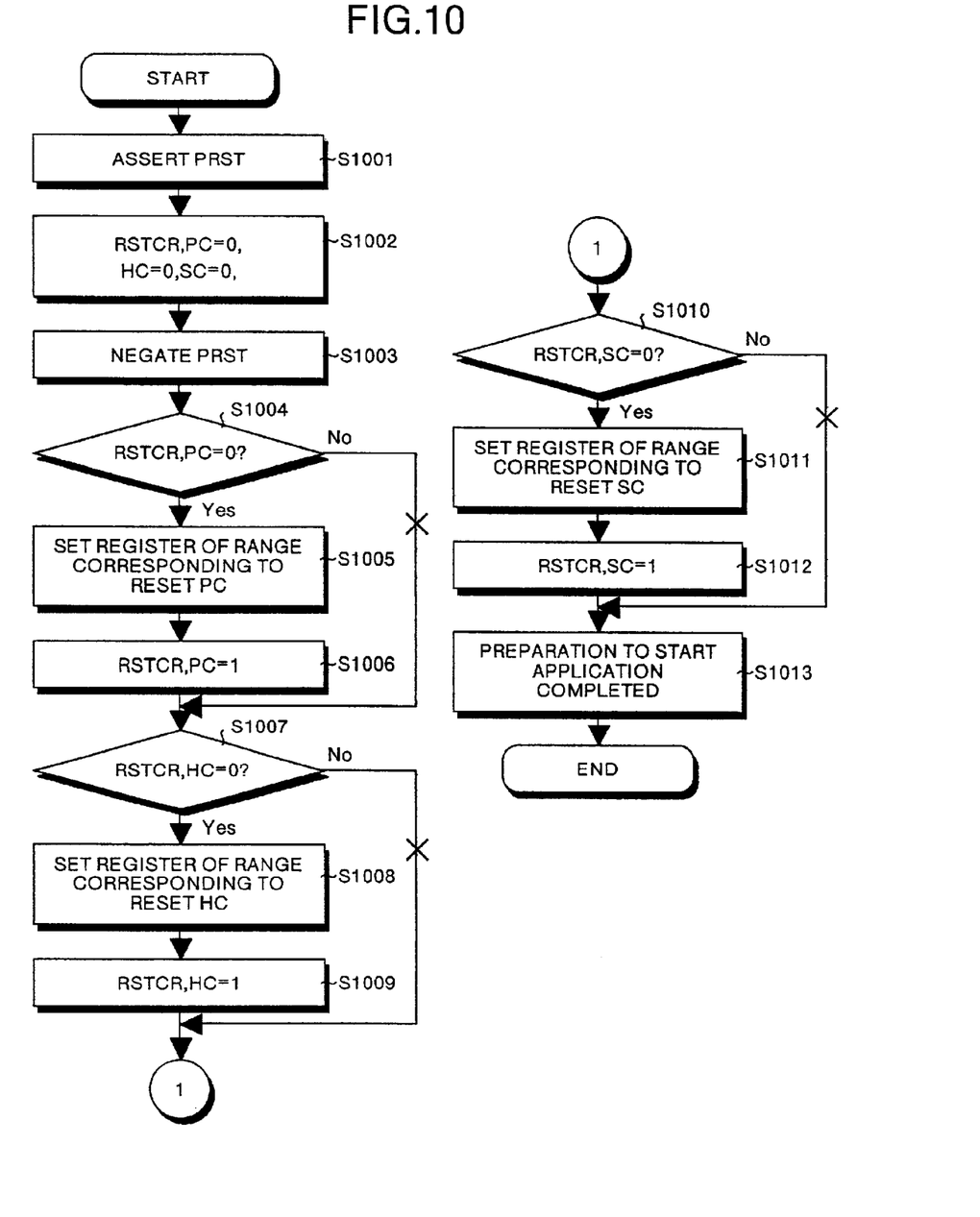
FIG. 10 is a flow chart showing an example of the initialization processing executed by PRST signal in the processor according the embodiment of the present invention.

The initialization program housed in the ROM refers the value of the PC bit 31 (step S1004) and confirms that that value is "0", for example, (step S1004: YES). As a result, a routine that includes the processing needed when a PRST signal is asserted is executed. After the processor 1 has started up, the address information for accessing the RAM 5 is set, for example, in the register (AMR) 47 for setting the comparative inhibited bits of the address range and the register (ASR) 46 for setting the start address of the address range.

For example, by setting "0x0000_0000" in the register (ASR) 46 for setting the start address and by setting "0x01FF_FFFF" in the register (AMR) 47 for setting the comparative inhibited bits, from "0x0000_0000" to "0x01FF_FFFF" is assigned to the RAM 5. Moreover, the first register group 16 is also set and the setting of the registers included in the first initial setting area is completed (step S1005). At this time, the initialization program performs the writing to the PC bit 31 and sets this bit, for example, to "1", (step S1006).

Thereafter, the initialization program refers to the value of the HC bit 32 (step S1007). Because the HC bit 32 is reset in step S1002, naturally, the value of the HC bit 32 is "0" (step S1007: YES). Accordingly, a routine that includes the processing needed when an external or internal HRST signal is asserted is executed and the setting of the registers included in the second initial setting area is completed (step S1008). Next, the initialization program performs the writing to the HC bit 32 and sets this bit to "1", for example (step S1009).

Subsequently, the initialization program refers to the value of the SC bit 33 (step S1010). In the same way as for the HC bit 32, naturally, the value of the SC bit 33 is "0" (step S1010: YES). Accordingly, a routine that includes the processing needed when an external or internal SRST signal is asserted is executed and the setting of the registers included in the third initial setting area is completed (step S1011). Next, the initialization program performs the writing to the SC bit 33 and sets this bit to "1", for example (step S1012). As a result of the above processing, the preparation to start the application is completed (step S1013).

Figure 11:
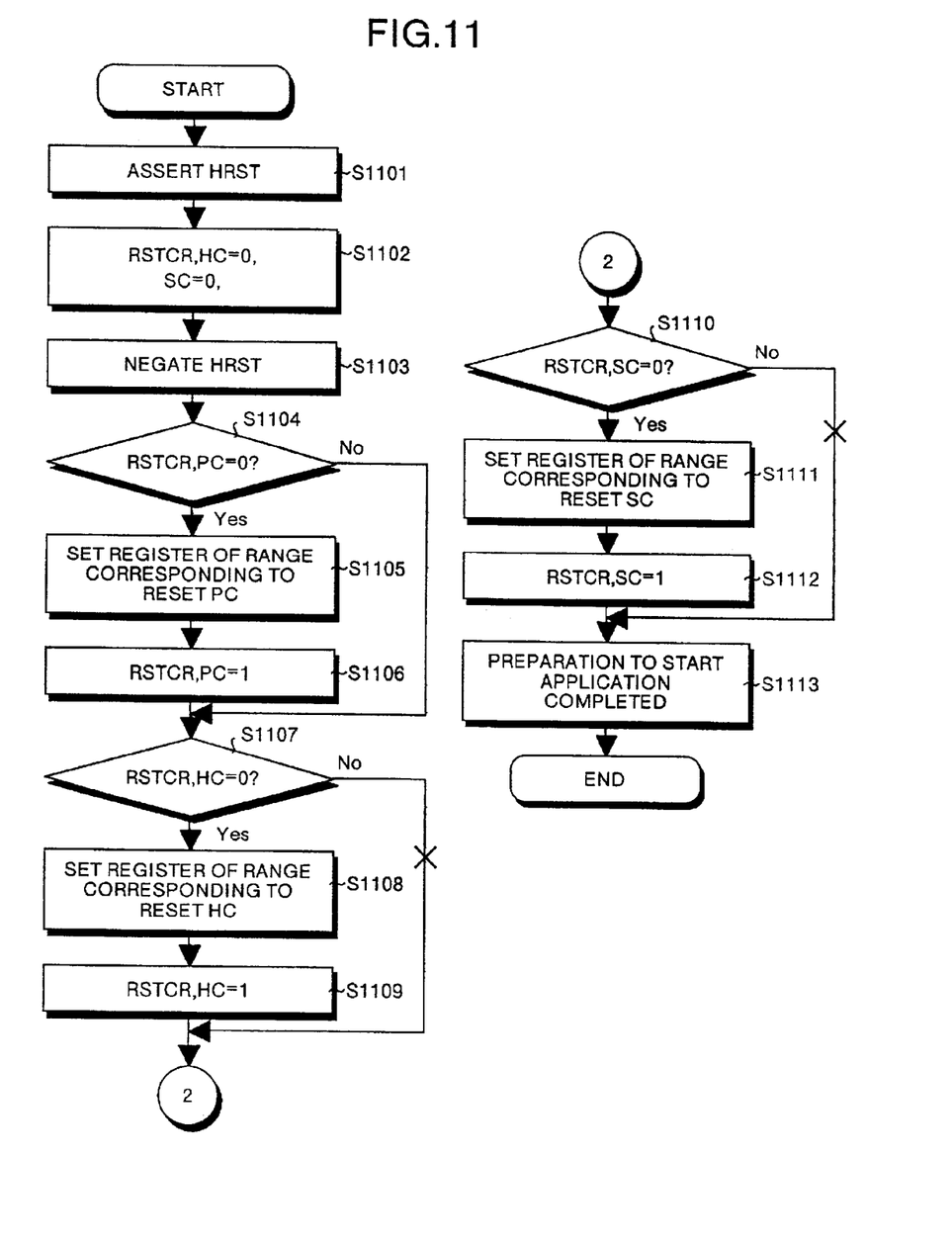
FIG. 11 is a flow chart showing an example of the initialization processing executed by HRST signal in the processor according the embodiment of the present invention.

Next, a description will be given with reference made to the flow chart shown in FIG. 11 of the reactivation sequence when reactivation is performed using an external HRST signal at the point that this becomes necessary after the processor 1 has been reactivated and in a state in which the processor 1 has stopped all the clocks itself in the clock control section 15 with the stimulus therefore being the fact that processing held to be necessary for a fixed time has not been issued in the processor 1. In the flow chart shown in FIG. 11, firstly, an HRST signal is asserted from the outside (step S1101).

As a result of this, the register stopping the clocks in the clock control section 15 is reset and the supply of clocks to the interior of the processor 1 is started. In addition, the HC bit 32, and the SC bit 33 of the setting completion display register (RSTCR) 3 are reset to "0", for example (step S1102). At this time, the reset operation is not performed for the PC bit 31. Accordingly, in the RAM 5, the effective data remains in a held state.

Next, when the external HRST signal is negated (step S1103), the initialization program stored in the RAM 5 refers to the value of the PC bit 31 (step S1104). If the value of the PC bit 31 is "1" (step S1104: NO), because all of the registers contained in the first initial setting area are in a state in which they have been set, the initial setting processing for the first initial setting area (i.e. steps S1105 and S1106) are omitted.

Next, the initialization program refers to the value of the HC bit 32 (step S1107). Here, because the value of the HC bit 32 is naturally "0" (step S1107: YES), the registers contained in the second initial setting area are set (step S1108) and the value of the HC bit 32 is set to "1" (step S1109).

Continuing on, the initialization program refers to the value of the SC bit 33 (step S1110). Because the value of the SC bit 33 is also naturally "0" (step S1110: YES) the registers contained in the third initial setting area are set (step S1111) and thereafter the value of the SC bit 33 is set to "1" (step S1112). As a result of the above processing, the preparation to start the application is completed (step S1113). Note that the reactivation sequence shown in FIG. 11 is the same as that when an internal HRST signal is activated.

Here, regardless of whether or not the PC bit 31 of the setting completion display register (RSTCR) 3 is reset in step S1102, the reason for referring to the value of the PC bit 31 in step S1104 is because if an internal HRST signal or an internal HRST signal is asserted during the initialization sequence shown in FIG. 10 as a result, for example, of the assertion of a PRST signal before the initial setting processing of the first initial setting area has been completed, then it is necessary to complete the initial setting processing of the first initial setting area. This is achieved as a result of the processor 1 of the present embodiment being provided with the setting completion display register (RSTCT) 3 and having a structure in which it is able to discover whether or not the initial setting processing of each initial setting area has been completed by referring to this register.

Accordingly, if the structure is one that does not have the setting completion display register (RSTCR) 3 provided but instead has provided a plurality of reset signals and a plurality of initial setting areas to correspond with the respective reset signals, and initial setting processing of the areas that correspond to the asserted reset signals is performed, then if external HRST signals or internal HRST signals are asserted during the execution of the initialization sequence as a result of the assertion of the PRST signals, in some cases the initial setting processing of the second and third initial setting area is completed without the initial setting of the first initial setting area being performed to its completion. In other words, the problem occurs that the processor 1 does not reach a fully activated state.

In order to prevent this type of problem from occurring, the value of the PC bit 31 is referred to in step S1104. If that value is a reset value, the initial setting processing of the first initial setting area is performed (step S1105). Thereafter, the value of the PC bit 31 is reset (step S1106) and the routine moves to step S1107.

Figure 12:
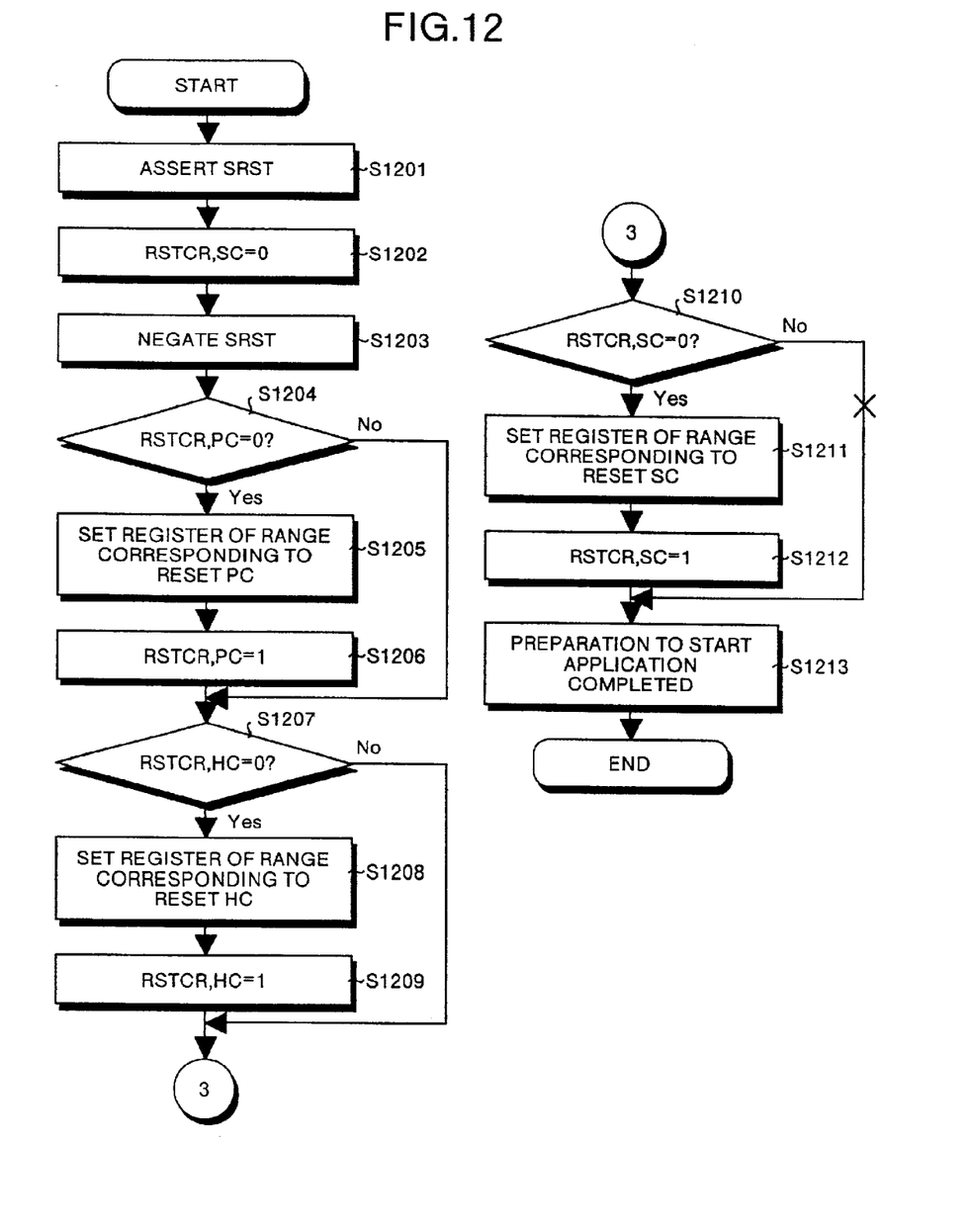
FIG. 12 is a flow chart showing an example of the initialization processing executed by SRST signal in the processor according the embodiment of the present invention.

Next, a description will be given of the activation processing sequence by an external SRST signal or an internal SRST signal with reference made to the flow chart shown in FIG. 12. In the flow chart shown in FIG. 12, firstly, when an external or internal SRST signal is asserted (step S1201) the registers in the instruction fetch control section 11, the instruction execution section 12, and the cache unit 13 are all initialized. In addition, the SC bit 33 of the setting completion display register (RSTCR) 3 is reset to "0", for example (step S1202). At this time, the reset operations for the PC bit 31 and the HC bit 32 are not performed.

When the internal or external SRST signal is negated (step S1203), a request to fetch an instruction is issued from the initial address "0xFF00_0000". The initialization program housed in the RAM 5 refers the value of the PC bit 31 (step S1204) and if that value is "1" (step S1204: NO), then because the registers contained in the first initial setting area are all in a set state, the initial setting processing (steps S1205 and S1206) are omitted for the first initial setting area.

Next, the initialization program refers to the value of the HC bit 32 (step S1207) and if that value is "1" (step S1207:

NO), then because the registers contained in the second initial setting area are all in a set state, the initial setting processing (steps S1208 and S1209) are omitted for the second initial setting area.

Continuing on the initialization program refers to the value of the SC bit 33 (step S1210). Naturally, the value of the SC bit 33 is "0" (step S1210:YES). Accordingly, the registers contained in the third initialization area are set (step S1211) and thereafter the value of the SC bit 33 is set to "1" (step S1212). As a result of the above processing, the preparation to start the application is completed (step S1213).

Here, regardless of whether or not the PC bit 31 and the HC bit 32 of the setting completion display register (RSTCR) 3 are reset in step S1202, the reason for referring to the value of the PC bit 31 in step S1204 and to the value of the HC bit 32 in step S1207 is so as to prevent the same problems that arise if an internal HRST signal or an internal HRST signal is asserted during the initialization sequence by a PRST signal.

Accordingly, if, as a result of referring to the value of the PC bit 31 in step S1204, that value is found to be a reset value (step S1204: YES), the initial setting processing for the first initial setting area is performed (step S1205) and, after the value of the PC bit 31 has been set (step S1206), the routine moves to step S1207. In step S1207 the value of the HC bit 32 is referred to and if that value is a reset value (step S1207: YES), the initial setting processing for the second initial setting area is performed (step S1208) and, after the value of the HC bit 32 has been set (step S1209), the routine moves to step S1210.

According to the above described embodiment: the first initial setting area, the second initial setting area, and the third initial setting area are initially set by PRST signal; the second initial setting area, and the third initial setting area are initially set by external HRST signal or internal HRST signal; and the third initial setting area is initially set by external SRST signal or internal SRST signal. As a result, if a second reset signal is generated, it is possible to omit the initial setting of the first initial setting area, and if a third reset signal is generated, it is possible to omit the initial setting of the first initial setting area and the second initial setting area.

Accordingly, when an external HRST signal or an internal HRST signal, or an external SRST signal or an internal SRST signal is generated, it is possible to rapidly bring the processor back into operation from a stopped state. Note that, in order to simplify the description in the above described embodiment, the description was of only a portion of the registers. Because the number of registers contained in each initial setting area is extremely large in an actual processor, the difference in the initialization range is even greater, which is why the restart of the processor from the stopped state is so rapid.

Moreover, according to the above described embodiment, by referring to the first flag stored in the PC bit 31, the second flag stored in the HC bit 32, and the third flag stored in the SC bit 33, it is possible to determine whether or not the initial setting processing has been completed in each initial setting area. Therefore, if another separate reset signal is asserted during the processing of the initialization sequence by PRST signal, it is possible to prevent the occurrence of the problem of the initial setting processing of the second and third initial setting areas being completed without the initial setting of the first initial setting area being performed to completion.

The present invention in the above description is not limited to the above embodiment and may be altered in a variety of ways. For example, the number of initial setting areas is not limited to three and two or four or more initial setting areas are possible. Moreover, which register is contained in which initial setting area is also optional.

According to the present invention, for example, a processor as a whole is initially set using a first reset signal. An area other than a register group that is essential for performing communication between a processor and the outside of the processor is initially set using a second reset signal. Moreover, only the register group involved with the execution of instructions within the processor is initially set using a third reset signal. Therefore, when the second reset signal is generated it is possible to omit the initial setting of the register group that is necessary for performing communication between a processor and the outside of the processor. When the third reset signal is generated it is possible to omit the initial setting of areas other than the register group involved with the execution of instructions within the processor. As a result, when the second or third reset signal is generated, it is possible to bring the processor back to an operating state extremely rapidly from a stopped state.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A processor comprising:
   a first initial setting area which is initialized based on an input of a first reset signal;
   a second initial setting area which is initialized based on an input of either the first reset signal or a second reset signal not overlapping with said first initial setting area;
   a first flag that is cleared by an input of the first reset signal and that is set when initial setting of the first initial setting area has been completed; and
   a second flag that is cleared by an input of either of the first and second reset signals and that is set when initial setting of the second initial setting area has been completed, wherein:
   when the first reset signal is input, the first input setting area is initialized after confirmation that the first flag is cleared and the second initial setting area is initialized after confirmation that the first flag is set and the second flag is cleared, and
   when the second reset signal is input, the second initial setting area is initialized after confirmation that the first flag is set and the second flag is cleared without clearing the first flag.

2. The processor according to claim 1, further comprising:
   a third initial setting area which is initialized based on an input of the first or second reset signals or a third input signal and which do not overlap with both said first initial setting area and said second initial setting area; and
   a third flag that is cleared by an input of any one of the first through third reset signals and that is set when initial setting of the third initial setting area has been completed, wherein:
   when any one of the first and second rest signals is input, the third initial setting area is initialized after confirmation that the first and second flags are set and the third flag is cleared, and when the third reset signal is input, the third setting area is initialized after confirmation that the first and second flags are set and the third flag is cleared without clearing the first and second flags.

3. The processor according to claim 2, wherein:

the first initial setting area is formed by a first register group performing communication between the processor and an outside of the processor;

the third initial setting area is formed by a second register group relating to execution of instructions inside the processor; and the second initial setting area is an area other than both the first register group and the second register group.

4. The processor according to claim 2, further comprising:

an n-th initial setting area, where n is an integer having a value equal to or greater than 4, which does not overlap with each initial setting area from the first initial setting area through an (n−1)-th initial setting area and which is initialized based on an input of the first reset signal through an n-th reset signals different from any of the first through (n−1)-th reset signals; and an n-th flag that is cleared by an input of any of the first reset signal through the n-th reset signal and that is set when initial setting of the n-th initial setting area has been completed, wherein:
 when any one of the first, second and third rest signals is input, the n-th initial setting area is initialized after confirmation that the first flag through an (n−1)-th flag are set and the n-th flag is cleared, and
 when the n-th reset signal is input, the n-th initial setting area is initialized after confirmation that the first through (n−1)-th flags are set and the n-th flag is cleared without clearing the first through (n−1)-th flags.

5. The processor according to claim 1, wherein is an external input terminal of the processor receives the respective reset signals from the outside.

6. The processor according to claim 1, wherein the respective reset signals are generated within the processor.

7. A method of controlling resetting of a processor, the processor comprising:

a first initial setting area which is initialized based on an input of a first reset signal;

a second initial setting area which is initialized based on an input of either the first reset signal or a second reset signal not overlapping with said first initial setting area;

a first flag that is cleared by an input of the first reset signal and that is set when initial setting of the first initial setting area has been completed; and a second flag that is cleared by an input of either of the first and second reset signals and that is set when initial setting of the second initial setting area has been completed, wherein:
 when the first reset signal is input, the first initial setting area is initialized after confirmation that the first flag is cleared and the second initial setting area is initialized after it is confirmed that the first flag is set and the second flag is cleared, and
 when the second reset signal is input, the second initial setting area is initialized after confirmation that the first is set and the second flag is cleared without cleaning the first flag, the method comprising:

clearing each of the first and second flags corresponding to each of the first and second signals;

confirming that each of the first and second flags is cleared, and initializing each of the first and second initial setting areas corresponding to each of the first and second flags that is cleared; and setting each of the first and second flags repeatedly, after completion of initializing each of the first and second initial setting areas, until all of the first and second first are set.

8. A method of controlling resetting of a processor, the processor comprising:

a first initial setting area which is initialized based on an input of a first reset signal;

a second initial setting area which is initialized based on an input of either the first reset signal or a second reset signal not overlapping with said first initial setting area;

a first flag that is cleared by an input of the first reset signal and that is set when initial setting of the first initial setting area has been completed; and a second flag that is cleared by an input of either of the first and second reset signals and that is set when initial setting of the second initial setting area has been completed, wherein:

the method comprises;

clearing the first and second flags when the first reset signal is input, and clearing the second flag when the second reset signal is input;

when the first signal is input, initializing the first initial setting area after confirming that the first flag is cleared, and initializing the second initial setting area after confirming that the first flag is set and the second flag is cleared;

when the second rest signal is input, initializing the second initial setting area after confirming that the first flag is set and the second flag is cleared, without clearing the first flag; and setting each of the first and second flags corresponding to each of the first and second initial setting which initialized.

9. A method of controlling resetting of a processor, the processor comprising:

a first initial setting area which is initialized based on an input of a first reset signal;

a second initial setting area which is initialized based on an input of either the first reset signal or a second reset signal not overlapping with said first initial setting area;

a third initial setting area which is initialized based on an input of the first or second reset signals or a third input signal not overlapping both said first initial setting area and said second initial setting area;

a first flag that is cleared by an input of the first reset signal and that is set when initial setting of the first initial setting area has been completed;

a second flag that is cleared by an input of either of the first and second reset signals and that is set when initial setting of the second initial setting area has been completed; and a third flag that is cleared by an input of any one of the first through third reset signals and that is set when initial setting of the third initial settling area has been completed, wherein:

the method comprises;

clearing the first flag to the third flag when the first reset signal is input, clearing the second and third flags when the second reset signal is input, and clearing the third flag when the third reset signal is input;

when the first signal is input, initializing the first signal initial setting area after confirming that the first flag is cleared, initializing the second signal initial setting area after confirming that the first flag is set and the second flag is cleared, and initializing the third signal initial setting area after confirming that the first and second flag are set and the third flag is cleared;

when the second signal is input, initializing the second signal initial setting area after confirming that the first flag is set and the second flag is cleared without clearing the first flag, and initializing the third signal initial setting area after confirming that the first and second flags are set and the third flag is cleared;

when the third signal is input, initializing the third initial setting area after confirming that the first and second flags are set and the third flag is cleared without clearing the first and second flags; and setting each of the first, second, and third flags corresponding to each of the first, second, and third initial setting area which is initialized.

10. The method of controlling resetting of a processor according to claim 9, wherein:

the first initial setting area is formed by a first register group performing communication between the processor and an outside of the processor;

the third initial setting area is formed by a second register group relating to the execution of instructions inside the processor; and the second initial setting area is an area other than both the first register group and the second register group.

11. A method of controlling resetting of a processor, the processor comprising:

a first initial setting area which is initialized based on an input of a first reset signal;

a second initial setting area which is initialized based on an input of either the first reset signal or a second reset signal not overlapping with said first initial setting area;

a third initial setting area which is initialized based on an input of the first or second reset signals or a third input signal not overlapping both said first initial setting area and said second initial setting area;

an n-th initial setting area, where n is an integer having a value equal to or greater than 4, which do not overlap with each initial setting area, from the first initial setting area through an (n–1)-th initial setting area, and which is initialized based on an input of the first reset signal through an n-th reset signal different from any of the first through (n–1)-th reset signals;

a first flag that is cleared by an input of the first reset signal and that is set when initial setting of the first initial setting area has been completed;

a second flag that is cleared by an input of either of the first and second reset signals and that is set when initial setting of the second initial setting area has been completed;

a third flag that is cleared by an input of any one of the first through third reset signals and that is set when initial setting of the third initial setting area has been completed; and an n-th flag that is cleared by an input of any of the first reset signal through the n-th reset signal and that is set when initial setting of the n-th initial setting area has been completed, wherein: the method comprises;

clearing the first flag to the n-th flag when the first reset signal is input, clearing the second flag to the n-th flag when the second reset signal is input, clearing the third flag to n-th flag when the third reset signal is input, and clearing the n-th flag when the n-th reset signal is input;

when the first signal is input, initializing the first signal initial setting area after confirming that the first flag is cleared, initializing the second initial setting area after confirming that the first flag is set and the second flag is cleared, initializing the third signal initial setting area after confirming that the first and second flags are set and the third flag is cleared, and initializing the n-th initial setting area after confirming that the first flag through an (n–1)-th flag are set and the n-th flag is cleared;

when the second signal is input, initializing the second initial setting area after confirming that the first flag is set and the second flag is cleared without clearing the first flag, initializing the third signal initial setting area after confirming that the first and second flags are set and the third flag is cleared, and initializing the n-th initial setting area after confirming that the first through (n–1)-th flags are set and the n-th flag is cleared;

when the third signal is input initialing the third initial setting area after confirming that the first and second flags are set and the third flag is cleared without clearing the first and second flags, and initializing the n-th initial setting area after confirming that the first through (n–1)-th flags are set and the n-th flag is cleared;

when the n-th reset signal is input, initializing the n-th initial setting area after confirming that the first through (n–1)-th flags are set and the third flag is cleared without clearing the first through (n–1)-th flags; and setting each of the first flag to the n-th flag corresponding to each of the first initial setting area to the n-th setting area which is initialized.

* * * * *

UNITED STATES PATENT AND TRADEMARK OFFICE
CERTIFICATE OF CORRECTION

PATENT NO. : 6,963,969 B2  
APPLICATION NO. : 09/985766  
DATED : November 8, 2005  
INVENTOR(S) : Hiroyuki Utsumi et al.

It is certified that error appears in the above-identified patent and that said Letters Patent is hereby corrected as shown below:

Column 10, Line 64, delete "rest" and insert - - reset - - therefor.
Column 11, Line 21, delete "signals" and insert - - signal - - therefor.
Column 11, Line 27, delete "rest" and insert - - reset - - therefor.
Column 12, Line 7, after "second" delete "first" and insert - - flags - - therefor.
Column 12, Line 24, delete "comprises;" and insert - - comprises: - - therefor.
Column 12, Line 33, delete "rest" and insert - - reset - - therefor.
Column 12, Line 38, after "setting" insert - - area - -.
Column 12, Line 61, delete "settling" and insert - - setting - - therefor.
Column 12, Line 63, delete "comprises;" and insert - - comprises: - - therefor.
Column 13, Line 7, delete "flag" (first occurance) and insert - - flags - - therefor.
Column 14, Line 13, delete "comprises;" and insert - - comprises: - - therefor.
Column 14, Line 38, after "input" insert - - , - -.
Column 14, Line 47, delete "third" and insert - - n-th - - therefor.

Signed and Sealed this

Fifteenth Day of August, 2006

JON W. DUDAS  
*Director of the United States Patent and Trademark Office*